Figure 1:
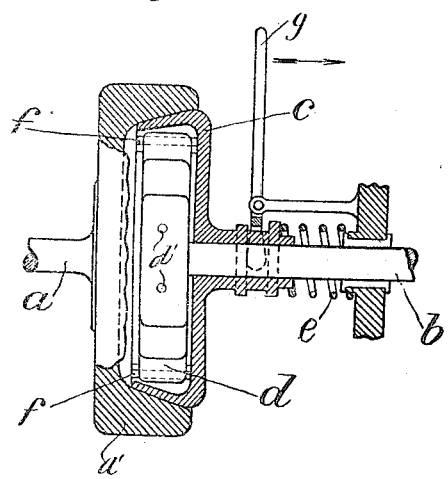

L. DUFOUR.
FRICTION COUPLING.
APPLICATION FILED MAR. 31, 1916.

1,231,341.

Patented June 26, 1917.

Inventor
Léon Dufour
By Serrell & Son
his Attorneys

UNITED STATES PATENT OFFICE.

LÉON DUFOUR, OF GENEVA, SWITZERLAND.

FRICTION-COUPLING.

1,231,341.  Specification of Letters Patent.  Patented June 26, 1917.

Application filed March 31, 1916. Serial No. 87,951.

*To all whom it may concern:*

Be it known that I, LÉON DUFOUR, engineer, a citizen of Switzerland, residing at Geneva, Canton of Geneva, in the Confederation of Switzerland, have invented certain new and useful Improvements in Friction-Couplings, of which the following is a specification.

The object of the invention is the provision of a friction-coupling device in the use of which the required effort for uncoupling is very slight, while the coupling friction, though being quite soft, still remains perfectly true and sure.

In most friction-coupling devices, as for instance in those employed with auto-cars, the cross section of that part of the coupling shaft, whereon the coupling slides, is either square or shaped like a Maltese cross, or in some similar form, whereby the cone is enabled to carry the shaft along in its rotating movement. This movement will be imparted to the shaft very abruptly if the cone is not allowed to slide gradually, and therefore if it is desired to obtain a certain softness of coupling, and to accomplish this coupling progressively, the cone must be permitted to turn on the shaft to a certain extent. In doing so it becomes necessary to cause the cone to slide also on the shaft in an axial direction while a part of the momentum of turning has already been transmitted to this shaft. In the couple of the forces from the cone to the shaft thus transmitted the lever arm is very small owing to the relatively small diameter of the shaft, while the force necessary to be transmitted is relatively very great. For this reason the coupling friction necessary to obtain this force, which friction acts against an axial sliding movement of the cone, and thereby also against a complete coupling, will be very considerable. On this account in order to effect a complete coupling a working spring of very much more power will have to be employed than would be needed for simply maintaining the coupling parts together, and therefore also much effort is required for uncoupling the clutch.

This inconvenience will be avoided by this invention owing to the fact that the turning momentum is transmitted to the driven shaft by means of a laminated or leaf spring, the middle portion of which is secured to either the driving or driven shaft, and the ends of the spring are held between contact pieces arranged on the surface of a sliding coupling cone in such a manner that the sliding surfaces are as far distant as possible from the axis of rotation in order to diminish the longitudinal friction and thereby also the power required in the coupling spring, which also lessens the needed effort for uncoupling.

Figure 2:
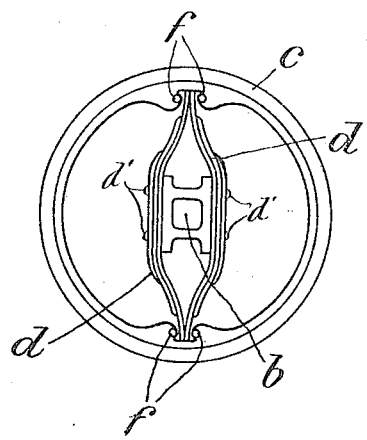

In the drawing Figures 1 and 2 are respectively an axial section and a front view of one form of my improved coupling.

Figure 3:
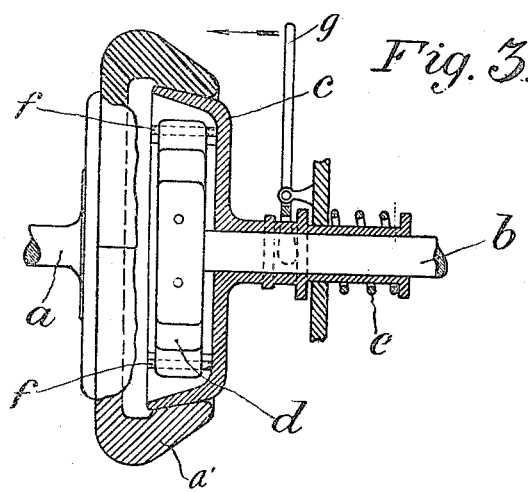

Fig. 3 is an axial section of another form thereof.

In the form of the invention shown in Figs. 1 and 2 the driving shaft $a$ of a car is provided with a disk $a^1$ serving as a fixed coupling cone, that is to say a cone which is not slidable in an axial sense, and one that presents a hollow, shaped like a truncated cone, the larger base of which is located on one of the side faces of the disk $a^1$.

The driven shaft $b$ is in alinement with the driving shaft $a$, and near to its end a coupling cone $c$ is fitted loosely thereon so as to be free to slide and to turn, while at its extremity the center portion of a laminated spring $d$ is attached by means of bolts or rivets the heads of which are indicated at $d^1$. The ends of the spring $d$ are held between contact pieces $f$ arranged on the surface of said cone $c$. These contact pieces may be made of cylindrical pieces of fiber or other suitable material, and are adjusted so as to slide on the ends of spring $d$ whenever the cone $c$ slides on the shaft $b$, that is to say, both when the clutch is connected by the spring $e$, or disconnected by the use of the lever $g$.

The working of this form of the invention is as follows:

When the coupling is effected progressively by permitting the action of the spring $e$ to shift the cone $c$ to the left, the momentum of turning is transmitted to the shaft $b$ by means of the contact pieces $f$ and the spring $d$; but as the contact pieces are relatively at a great distance from the common axis of rotation the lever arm of the transmitted force is long, while the force is small, and as this force is produced by the friction of the cone $c$ pressed by the spring $e$ within the cavity of the disk $a^1$, shaped like a truncated cone, the spring $e$ may be comparatively weak, and the effort required for uncoupling will be very small.

Owing to the fact that the spring $d$ forms an elastic connection between the cone $c$ and the shaft $b$, the coupling will become soft even if no care is taken in letting the cone $c$ gradually slide within the disk $a^1$.

In the form of the invention shown in Fig. 3 the disk $a^1$ on the driving shaft $a$ is provided with a cavity shaped like a truncated cone, the smaller base of which is located in that side face of the disk which is opposite shaft $a$, and within which the cone $c$ is located.

In both forms of the invention the momentum of turning is transmitted from the shaft $a$ to the shaft $b$, but obviously the parts might be reversed without altering the operation thereof or departing from the nature of my invention, and while I have herein shown and described my invention as applicable to auto-cars, it will be understood its employment is not limited to this particular use.

I claim as my invention:

1. In a friction coupling and in combination with a drive and a driven shaft, a coupling member fixed on the drive shaft, a coupling member mounted to slide and turn on the driven shaft, a leaf spring secured to the end of the driven shaft, devices secured in the movable coupling member for engaging the free ends of the leaf spring, and means for normally maintaining the movable coupling member in contact with the fixed coupling member.

2. In a friction coupling and in combination with a drive and a driven shaft, a coupling member fixed on the drive shaft, a coupling member mounted to slide and turn on the driven shaft, a leaf spring secured to the driven shaft and lying within the movable coupling member, contacts in the movable coupling member engaged by the extremities of the said leaf spring, and means whereby the movable coupling member is normally maintained in engagement with the fixed coupling member.

In testimony whereof I have affixed my signature in presence of two witnesses.

LÉON DUFOUR.

Witnesses:
DAVID MICHEL,
ROD. DE WEIN DERNBURG.